United States Patent [19]

Hassall et al.

[11] Patent Number: 5,686,169

[45] Date of Patent: Nov. 11, 1997

[54] PATTERN TO CONTROL SPREAD OF ADHESIVE DURING LAMINATION OF SHEETS

[75] Inventors: Stephen James Hassall, Churchville; Daniel Robert May, West Henrietta, both of N.Y.

[73] Assignee: Eastman Kodak Company, Rochester, N.Y.

[21] Appl. No.: 342,956

[22] Filed: Nov. 21, 1994

[51] Int. Cl.$^6$ ..................................................... B32B 7/14
[52] U.S. Cl. ......................... 428/195; 428/343; 156/275.5
[58] Field of Search ................................. 428/343, 195; 156/275.5

[56] References Cited

U.S. PATENT DOCUMENTS

| | | | |
|---|---|---|---|
| 2,294,347 | 8/1942 | Bauer et al. | 428/343 X |
| 2,476,097 | 7/1949 | Kagen et al. | 91/12 |
| 2,510,120 | 6/1950 | Leander | 428/343 X |
| 2,940,868 | 6/1960 | Patchell | 428/343 X |
| 3,329,547 | 7/1967 | Denenberg | 156/247 |
| 3,335,696 | 8/1967 | Faltin et al. | 118/5 |
| 3,462,226 | 8/1969 | Huffaker | 356/72 |
| 3,515,270 | 6/1970 | Tonn et al. | 428/343 X |
| 3,546,053 | 12/1970 | Oldberg et al. | 161/38 |
| 4,710,257 | 12/1987 | Mattei et al. | 156/578 |
| 4,863,537 | 9/1989 | Sadri | 156/62 |
| 5,276,478 | 1/1994 | Morton | 355/22 |
| 5,466,723 | 11/1995 | Dotson | 522/96 |
| 5,473,406 | 12/1995 | Hassall et al. | 355/22 |

FOREIGN PATENT DOCUMENTS

| | | |
|---|---|---|
| 0 108 632 | 5/1984 | European Pat. Off. . |
| 1 516 984 | 7/1978 | United Kingdom . |
| WO-A-90 14950 | 12/1990 | WIPO . |

*Primary Examiner*—Daniel Zirker
*Attorney, Agent, or Firm*—Clyde E. Bailey, Sr.; Charles E. Snee, III

[57] ABSTRACT

A first sheet (10, 32, 56) is coated by a coater (47) with a pattern comprising a plurality of discrete domains (12, 34) of a low-viscosity adhesive and is then laminated to a second sheet (70) by a paired-roller laminator (62). The viscosity of the adhesive is sufficiently low and the pressure of the laminator sufficiently high that the plurality of adhesive domains (12) are caused to spread during lamination and to displace air from between the sheets, forming thereby a single domain of adhesive which just fills the space between the sheets without adhesive being extruded substantially beyond the edges of the sheets and without air bubbles or voids being entrapped between the sheets. In a preferred pattern, the domains (12) comprise strips of adhesive with spaces (14) therebetween, the stripes being substantially parallel to the direction of lamination (16). The stripes can be joined by a connecting domain (20) at the leading edge (18) of the first sheet to enhance lamination near that edge, and can be notched or indented (28) at their distal or trailing ends to smooth the adhesive front at the completion of the laminating pass. Preferably, the adhesive is radiation curable, allowing relative movement of the two sheets if desired after laminating, and the adhesive in the single domain then is cured by exposure to appropriate radiation. The method is especially suitable for laminating a lenticular overlay sheet to a lineiform image sheet in forming a lenticular depth image print.

7 Claims, 3 Drawing Sheets

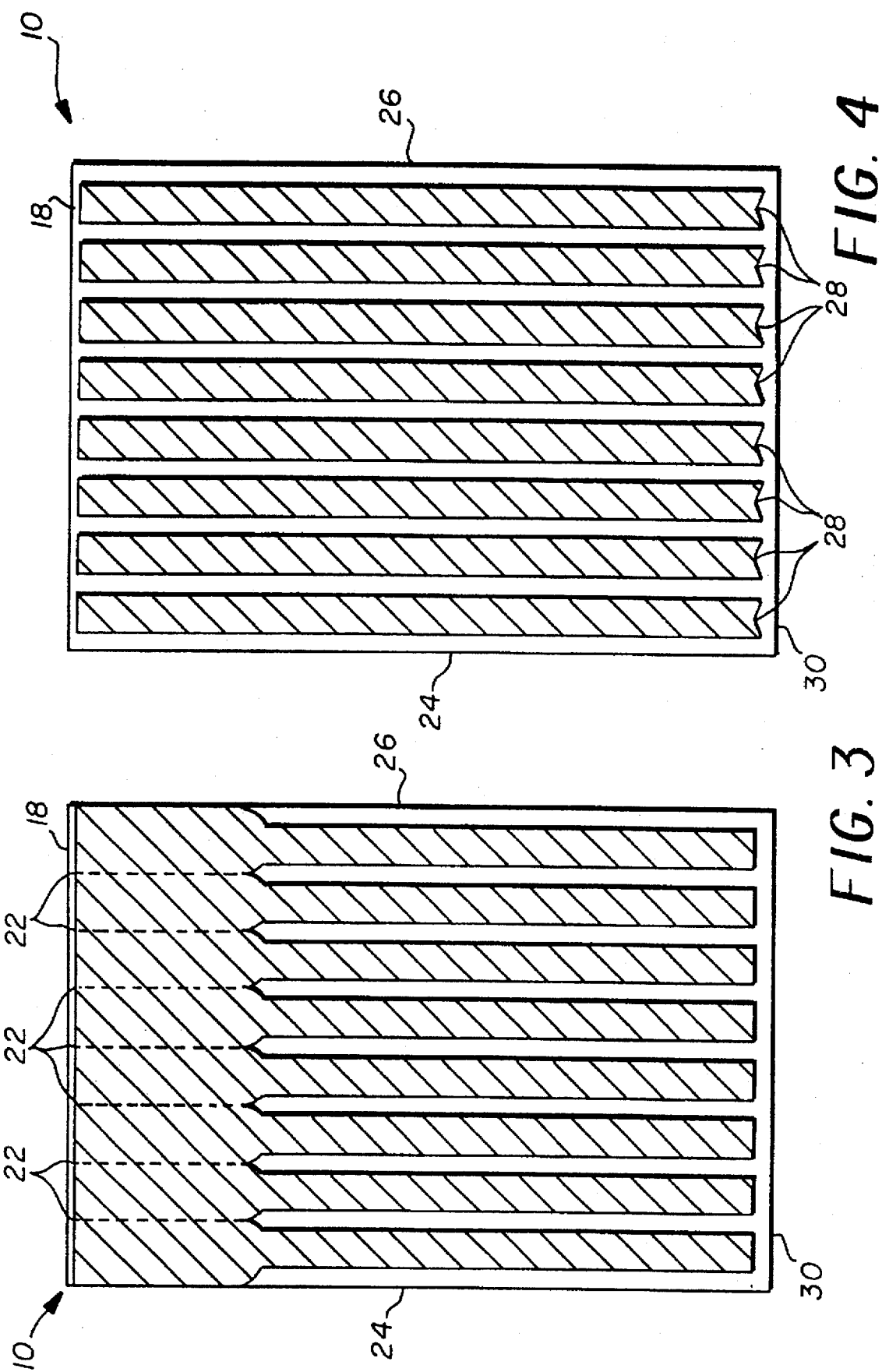

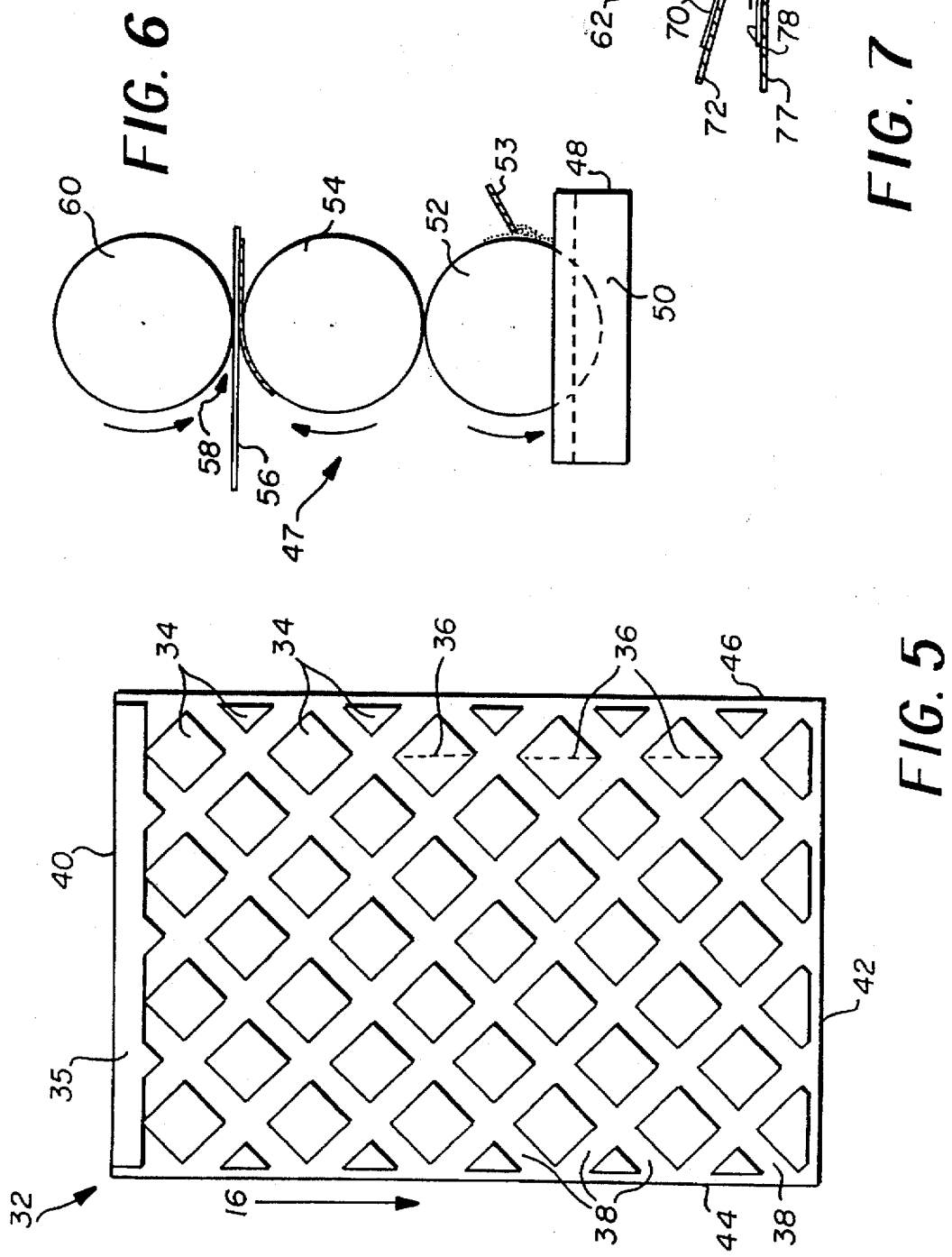

PATTERN TO CONTROL SPREAD OF ADHESIVE DURING LAMINATION OF SHEETS

FIELD OF THE INVENTION

The invention concerns apparatus and methods for controlling the spread of adhesive during lamination of sheets, more particularly, to adhesive lamination of sheets by pressure-loaded nip rollers. Most particularly, the invention is related to apparatus and methods for laminating a lineiform image sheet to a lenticular array sheet to provide a laminated print which elicits a visual impression of three-dimensional depth.

BACKGROUND OF THE INVENTION

Lenticular arrays are a known means for giving certain images the appearance of depth or three-dimensionally. Images are created which comprise an array of parallel image lines which form a composite picture or lineiform image of a scene viewed from different angles. A lenticular sheet (lenticular overlay) comprising an array of contiguous, parallel, elongated lenticules is positioned in front of the lineiform image so that the lenticules cause each eye of the viewer to see different elements or views of the overall image. The viewer experiences parallax between the views in each eye and senses depth in the scene.

Depth images of this type have been created by exposing a photographic film through a lenticular array sheet and then developing the latent image. If the lenticular array is bonded to the photographic medium before exposure, or if the lenticular array is formed on the back of the photographic support itself, then the lineiform image and the array are automatically aligned. Such depth imaging requires that the image-forming photographic layer be on the back side of the photographic medium to be accessible to development chemicals. These types of images generally are not of high three-dimensional quality and do not lend themselves to electronic manipulation before the print is finalized. An additional shortcoming is that only transparency prints are possible, since the photographic medium must be exposed through the support, whereas reflection depth image prints are required in many applications.

Commonly assigned U.S. Pat. No. 5,276,478 describes an improved apparatus and methods for making depth images in which the lineiform image is generated electronically in the absence of a lenticular overlay, and the spacing between image lines is electronically controlled to provide improved alignment with the lenticules of a subsequently-adhered lenticular array sheet. The image sheet typically is rather thin and quite flexible but may be stiff or rigid. A thin layer of adhesive, typically a contract adhesive provided over the entire surface on the back side of the lenticular overlay or on the surface of the image sheet, joins the image and array sheets at their smooth interfaced surfaces.

While such depth image systems are capable of displaying images with striking appearances of three dimensions, efficiency of production requires rapid, accurate alignment of the image lines with the lenticules, and quality of the image seen by the observer depends greatly on imperfection-free lamination of the sheets. When contact or pressure-sensitive adhesive is used between the two sheets, achieving accurate alignment in the final depth image print can be quite difficult, particularly for rather large images, since proper alignment must be obtained before, and then maintained through, the laminating process which typically involves compressing the assembly of two sheets between a pair of pressure-loaded nip rollers. It is preferable to defer final alignment of the lenticules with the lineiform image lines until after the sheets have been joined by a layer of adhesive, although this requires that the adhesive remain mobile until after final alignment of the sheets. Hot melts, two-part epoxides, and heat-reactive adhesives, all of which can be still liquid after lamination, have been used with mixed success. Methods and apparatus for accurately aligning and bonding lenticular sheets and image prints after lamination using radiation-curable adhesives are disclosed in commonly assigned U.S. patent application No. 08/330,493, filed Oct. 10, 1996, U.S. Pat. No. 5,633,719. Preferably, such non-cured adhesives have relatively low viscosity to permit easy movement of the laminated sheets with respect to each other. However, low=viscosity adhesives are easily extruded undesirably from the edges of the sheets during lamination as described hereinbelow, high-viscosity adhesives being preferred to prevent such extrusion. Particularly for large-format depth image prints, the range of viscosities allowable by these competing considerations may be small or non-existent, and an adhesive which may be particularly desirable for, for example, curing behavior or optical properties may not have a viscosity in the suitable range.

Bubbles of air can become trapped between the sheets during lamination, leading to undesirable voids or distortions in the final image. Variations in thickness of the array sheet, the adhesive layer, and the image sheet can all contribute to such entrapment of air, since the adhesive-free sheet may not contact the full-coverage adhesive layer on the adhesive-bearing sheet along a uniform front as the nip of the laminating rollers passed over the forming laminate. Also, even an adhesive layer which is of uniform thickness before lamination tends to become thicker at the center of the sheets and thinner near the edges as the sheet assembly passes through the nip rollers during lamination, which can lead to poor bonding near the edges and distortion of the viewed image.

To assure that the volume of space between the sheets is entirely filled with adhesive after roller lamination, known laminating methods require than an excess of adhesive be applied initially. Such excess by definition is not contained between the sheets after lamination but rather is extruded along the edges of the sheets, requiring accommodations. Even when the stoichiometric quality of adhesive is used, extrusion (flow-out) at the edges can occur because the buildup of adhesive near the center of the laminate results in an excess in the center at the end of the laminating pass. One approach to deal with this problem is to wipe away the extruded excess prior to curing the adhesive. This is labor intensive, can lead to adhesive smears if not done carefully, exposed operators to aggressive chemicals, and requires that all edges be accessible. Another approach is to provide an image sheet and a lenticular overlay sheet which are substantially oversized and to extrude the excess adhesive into large margins which are trimmed away after curing. This is wasteful of materials and is labor intensive.

It is an object of the invention to provide improved patterns of adhesive domains on a sheet to be laminated to another sheet, which domains can flow together and join during lamination without entrapment of air between the sheets.

It is a further object of the invention to provide improve patterns of adhesive domains on a sheet to be laminated to anther sheet, which domains can flow together and join during lamination to just fill a volume between the sheets without adhesive being extruded from the edges of the sheets.

It is a still further object of the invention to provide a method for laminating a first sheet to a second sheet without entrapping air between the sheets and without extruding adhesive from the edges of the sheets and which will allow first and second sheets to be easily aligned by rotation and translation after lamination.

It is a still further object of the invention to provide improved patterns of adhesive domains on a lineiform image sheet to be laminated to a lenticular overlay sheet, which domains can flow together and join during lamination without entrapment of air and without adhesive being extruded from the edges of the sheets and without adhesive becoming firm.

SUMMARY OF THE INVENTION

Our invention is defined by the claims. One embodiment of our method is particularly useful for forming by lamination a depth image print comprising an image sheet being a lineiform image and having a first, leading edge; a lenticular array sheet having lenticules parallel to the lineiform image and a second, leading edge; and a layer of adhesive between the image and array sheets. Improved lamination to form the depth image print is achieved by first applying a pattern of discontinuous domains of adhesive on a mating surface of either the image sheet or the lenticular array sheet, preferably the image sheet. Then, using a laminator comprising a pair of pressure-loaded laminating rollers having a nip therebetween, the leading edge of the array sheet is placed between the rollers which may be unloaded to receive the edge of the array sheet. The leading edge of the image sheet then is inserted into the nip slightly behind the leading edge of the array sheet and the pressure-loaded laminating rollers are rotated to draw both the array and image sheets into and through the nip. As disclosed in commonly assigned U.S. Pat. No. 5,473,406 issued Dec. 5, 1995, preferably the array sheet is flexed away from the image sheet at the nip and into conforming contact with the nip roller on the same side of the apparatus as the array sheet, so that the surface of the array sheet deforms to ensure full contact with the image sheet in the nip and to help prevent air from being entrapped between the sheets as the sheets are drawn into the nip.

Advantageously, we have found that the laminating process can be improved by providing the adhesive entering the nip as a pattern of discontinuous domains of low-viscosity adhesive with adhesive-free spaced therebetween on a mating surface of one or the other of the sheets being laminated. By low viscosity is meant viscosities less than about 2000 centipoises and preferably less than about 500 centipoises but greater than about 10 centipoises. Under pressure from the laminating rollers, the adhesive domains are caused to spread between the sheets wherein the domains flow together and join seamlessly as the sheets pass through the laminating nip. Suitable pattern in accordance with the invention are those which permit air between the domains to vent toward one or more edges of the sheets as lamination progresses. In a preferred embodiment, domains of the pattern comprise discrete strips or rows of adhesive oriented at an angle away from the nip and preferably orthogonal to the nip so that the stripes of adhesive entering the nip are parallel to the direction of lamination. Alternatively, for example, the domains can be discrete quadrangles, preferably squares, preferably arrayed as a grid with diagonals of the quadrangles parallel to the direction of lamination, providing adhesive-free lanes for venting of air preferably at about 45° to the direction of lamination and at about 90° to each other.

To assure proper joining of domains at the start of lamination, it can be preferable in the pattern for the domains to be connected or laterally continuous for a short distance along the sheets in the direction of lamination.

We have found that each of the plurality of small domains of adhesive behaves like the single large domain that is the full-coverage adhesive layer of known laminating methods. The edges of strips, for example, spread laterally as the strips are compressed, and adhesive flow in the centers of strips becomes convex in the direction of lamination. The method of the present invention, however, is the diametric opposite of methods taught in the art. Known methods are directed to minimizing spreading of the adhesive by using high-viscosity adhesives and low laminating pressures. A preferred lamination in the known art undergoes no spreading of adhesive during lamination. In contrast, the present methods relies on and takes advantage of the spreading capabilities of low-viscosity adhesives to obtain a uniform, bubble-free adhesive layer, and manages the flow of adhesive near the edges to provide a satisfactory lamination having no flow-out of adhesive. Differing from the behavior of a single large domain, the spreading edges of adjacent strips in accordance with the present invention encounter each other and coalesce, the adhesive flowing laterally into spaces between the strips while laminating is proceeding longitudinally of the sheets, until the air in the volume of space defined by the edges of the adjacent strips and the mating surfaces of the sheets is expelled toward one of the edges of the sheets and is fully replaced by adhesive. This process of knitting the strips together proceeds dynamically to the end of lamination, providing a seamless, continuous adhesive layer between the sheets which is uniform in thickness and free of bubbles or voids.

The advancement of the adhesive front at the center of each domain results in a slight scalloping of the joined fronts of the strip domains at the distal edge of the laminate, but surface tension contains the fully-advanced front and prevents flow-out or dripping of the adhesive. If desired, the front can be further smoothed by providing a small notch or indent at the distal end of each stripe to act as a reservoir for the center accumulation of adhesive when the advancing front reaches the distal edge of the laminate.

Continuous longitudinal patterns of adhesive domains such as strips in accordance with the invention can be applied to a sheet surface to be laminated by a suitable continuous process, for example, extrusion hopper coating. Discontinuous patterns of patterns having transverse elements, such as the quadrangle array or the joined strips described hereinabove, are easily applied by known rotary printing processes such as offset or flexographic gravure coating or lithography. It is an advantage of the present invention that it is particularly suitable for use with desirably low-viscosity adhesives, and that these adhesives are easily applied in patterns in accordance with the invention by rotary printing techniques.

BRIEF DESCRIPTION OF THE DRAWINGS

The foregoing and other objectives, features, and advantages of the invention will be apparent from the following more particular description, including a presently preferred embodiment of the invention, as illustrated in the accompanying drawings in which:

FIG. 3 shoes the adhesive pattern of FIG. 2 as it would appear part way through lamination to a second sheet, the second sheet and the laminator being omitted from this view for clarity;

FIG. 4 shows the pattern of FIG. 1 with the distal ends of the adhesive strips indented or notched to provide reservoirs for superabundant adhesive in the centers of the strips at the completion of lamination;

FIG. 5 shows an alternative pattern of adhesive domains in accordance with the invention;

FIG. 6 is a schematic elevational view of a offset gravure coater suitable for printing patterns of adhesive domains in accordance with the invention; and FIG. 7 is a schematic elevational view of a laminator beginning a laminating pass of two sheets in accordance with the invention.

DETAILED DESCRIPTION OF THE INVENTION

Figure 2:
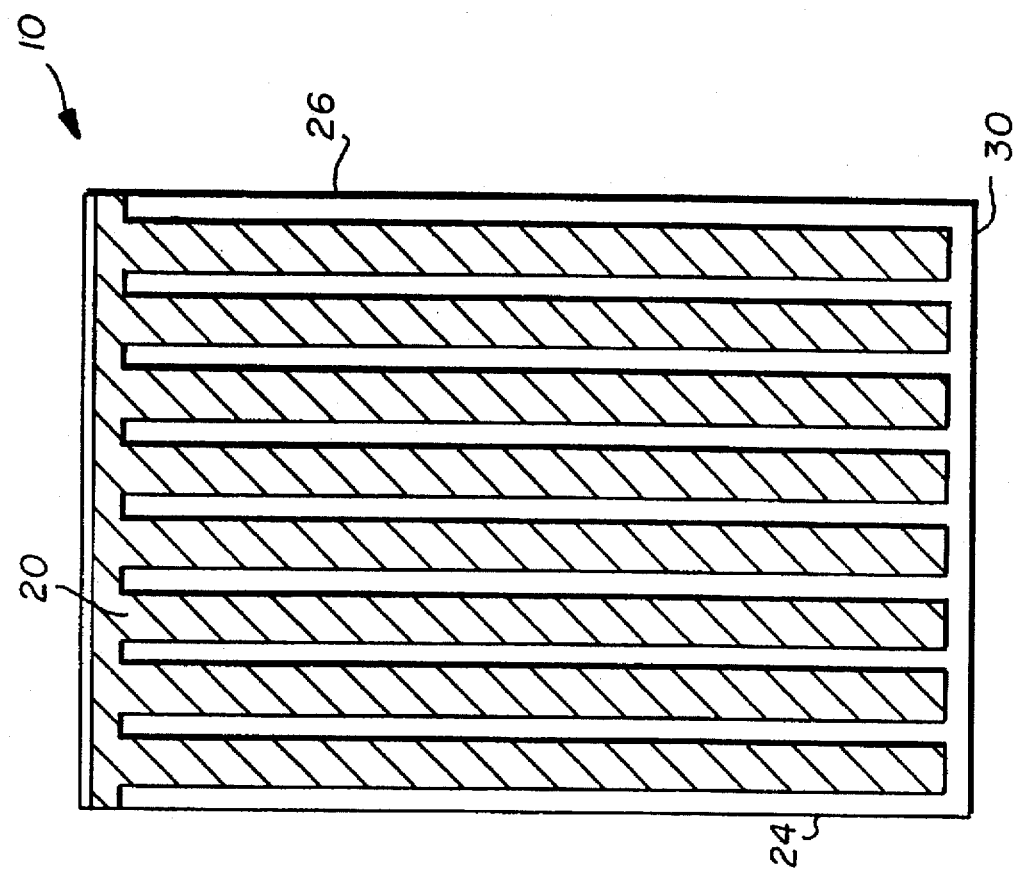
FIG. 2 shows the pattern of FIG. 1 with the strips connected laterally at the leading edge of the sheet to ensure coverage by adhesive in this area during subsequent lamination.
Figure 1:
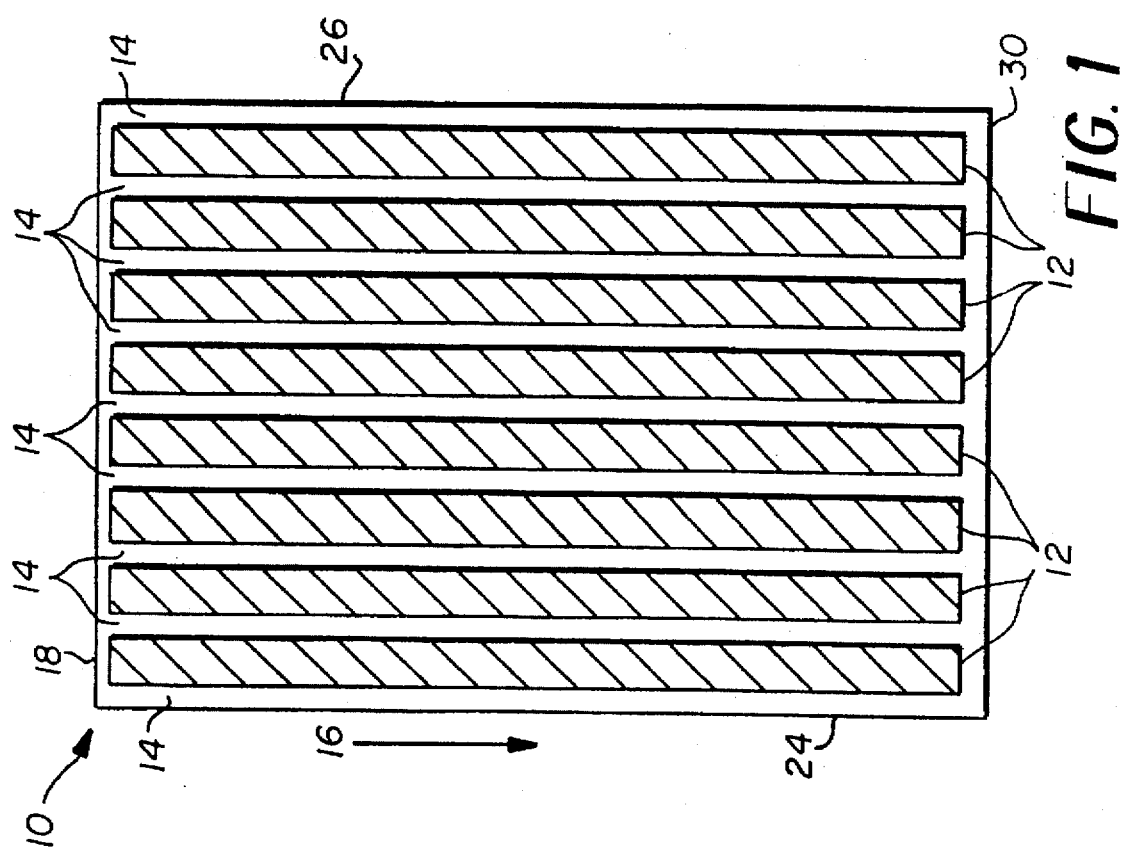
FIG. 1 shows a plan view of a pattern comprising a plurality of domains of adhesive in the form of a longitudinal stripes on a sheet to be laminated.

In contrast to known laminating methods involving fully coating a sheet with adhesive prior to the laminating step, our invention provides for a plurality of discrete domains of adhesive with adhesive-free spaces therebetween preferably on only one of two sheets to be laminated together. The invention relies on the spreading capabilities of low-viscosity adhesives to provide a uniform, bubble-free adhesive layer in a laminate comprising two sheets, and manages the flow of air and adhesive between the sheets during lamination to provide an improved laminate having full coverage of adhesive with no flow-out along the edges.

Referring to FIGS. 1 through 4, a sheet 10, to be laminated to a second sheet (not shown) which may be adhesive-free, has a pattern of discrete domains 12 of adhesive thereon in the form of strips separated by adhesive-free spaces 14. For laminating lenticular arrays to lineiform prints, the adhesive preferably is radiation-curable. Sheet 10 is typically a flexible plastic or paper sheet, for example, a lineiform photographic image a surface of a polyester, cellulose acetate, or paper support, to be laminated to a lenticular overlay sheet, although sheet 10 can also be stiff and rigid. Sheet 10 can be opaque, translucent, or transparent.

The adhesive in strips 12 is a liquid adhesive, preferably radiation-curable, having a viscosity of less than about 3000 centipoises, preferably less than 500 centipoises and greater than 10 centipoises, and must be chemically compatible with the materials of the sheets to be laminated, for example, the material of a lenticular overlay sheet and the photographic emulsions of an image sheet. One adhesive which is curable by exposure to ultraviolet light comprises a mixture of 30 to 70 parts, preferably 45 to 55 parts and most preferably 50 parts, of a non-yellowing, aliphatic urethane acrylate resin; 15 to 45 parts, preferably 25 to 35 parts and most preferably 27.5 parts of a beta-carboxyethyl acrylate; 10 to 40 parts preferably 20 to 30 parts and most preferably 22.5 parts of tetrahydro furfuryl acrylate; and 2 to 10 parts per hundred of a photo initiator such as commercially-available Darocure 1173 made by Ciba-Geigy Corporation of Hawthorn, N.Y. The urethane resin may be commercially available product CN966H90 made by Sartomer Company, Inc., of Exton, Pa. The composition of this adhesive is disclosed in commonly-assigned U.S. Pat. No. 5,466,723 issued Nov. 14, 1995. Other adhesives curable by ultraviolet light also may be used. This adhesive also may be cured by application of an electron beam.

The thickness of adhesive domains in accordance with the invention is preferably between 2 μm and 50 μm before lamination. A wide range of widths of stripes and spaces is permissible within the scope of the invention, depending upon the viscosity of the adhesive and the thickness of the stripes. We have found that strips widths and adhesive-free widths between about 0.75 mm and 20 mm, respectively, preferably between 1 mm and 3 mm, are suitable, and further that the ratio of stripe width to adhesive-free width should be between about 10 and about 0.25, preferably about 1.0.

Sheet 10 having adhesive striped domains 12 is intended to be laminated in a direction 16 which is substantially parallel to the stripes, that is, preferably at 90° to the line of a nip in an opposed-roller laminator. By direction of lamination is meant the direction of movement of the laminating nip rollers relative to the sheets being laminated. Other angles can be used, provided that air in the adhesive-free spaces is not prevented from escaping the advancing nip. Thus an angle of 0° (stripes parallel to the nip) is unacceptable in accordance with our invention, since air would be trapped between the domains of the pattern as they pass through the nip.

To ensure that the leading edge 18 of sheet 10 is fully covered by adhesive during the laminating process, and since adhesive tends to be spread with flow vectors in the direction of lamination 16 which is away from leading edge 18, it is preferable to connect strips 12 with a connecting domain 20 extending substantially across the width of sheet 12 for a short distance in the laminating direction, as shown in FIG. 2.

As lamination of sheet 10 to a second sheet progresses, the pressure of the laminator causes the adhesive strips to become thinner and broader by flowing laterally, progressively covering the spaces 14 between the strips which formerly were adhesive-free. The spreading strips meet and join at boundaries 22, also known as knitlines. When the stripes pass through the laminator, the striped domains lose their individuality and form a single adhesive layer of substantially uniform thickness across sheet 10, as shown in FIG. 3. The outboard stripes along left and right edges 24 and 26, respectively, of sheet 10 also expand outwardly to the edges but do not have sufficient volume of material in them for extrusion of adhesive to occur beyond edges 24 and 26.

During lamination, a dynamic bead of adhesive develops between the sheets in the advancing nip. This bead tends to be slightly convex in the direction of lamination at the centers of the strips and can result in a slightly non-uniform distribution of adhesive at the end of each stripe when the sheets have passed entirely through the laminating nip. Preferably, strips are provided with notches or indentations 28 at their distal ends, as shown in FIG. 4, which act as reservoirs for redistribution of the adhesive in the external bead, providing a uniform end to the adhesive layer without flow-out of adhesive at trailing edge 30 of sheet 10.

The speed and pressure of lamination are important parameters in causing strips 12 to join smoothly without entrapment of air. Optimum conditions can be determined experimentally for each application. We have found, for example, that for adhesives having viscosities of about 500 centipoises, a laminating linear speed of 1 to 5 meters per minute at a pressure of 3000 to 130,000 Newtons per meter of nip length allows the strips to merge smoothly as the sheets advance through the nip. In some applications, much higher speeds are possible, particularly with very low viscosity adhesives which spread readily, and practical ranges for laminating sheets and pressures in accordance without invention are about 0.03 to about 300 meters per minute and about 1000 to about 130,000 newtons per meter of nip length, respectively.

Patterns of discrete adhesive domains other than longitudinal stripes can be useful in accordance with the invention. One such pattern is shown in FIG. 5. Sheet 32 is like sheet 10 but instead of stripes sheet 32 is provided with a pattern comprising quadrangular adhesive domains 34 oriented with their diagonals 36 substantially parallel to direction of lamination 16 and adhesive-free lanes 38 between domains 34. Like connecting domain 20 shown in FIG. 2, a connecting domain 35 is provided at the leading edge 40 of the pattern on sheet 32. Lamination of sheet 32 to a second sheet (not shown) begins at leading edge 40 and progresses to trailing edge 42. Because the adhesive-free lanes are at substantially 45° to direction of lamination 16, air between domains 34 is expelled during lamination along left and right edges 44 and 46 of sheet 32, as well as along trailing edge 42. Of course, the inverse of the pattern shown in FIG. 4 would not be useful in accordance with our invention. If lanes 38 were adhesive domains instead, and quadrangles 34 were adhesive-free spaces, the pattern would serve to cause bubbles of air to be trapped between the sheets during lamination.

Patterns of adhesive domains in accordance with the invention can be applied to sheets to be laminated by known means, such as by gravure coating or printing. A schematic elevational view of a typical offset gravure coater 47 is shown in FIG. 6. Reservoir pan 48 contains an amount of low-viscosity adhesive 50 through which gravure roller 52 rotates counter clockwise. Gravure roller 52 preferably is provided with a roughness or grain on its circumferential surface to help in carrying adhesive 50 out of the pan. A doctor blade or bar 53 is spaced from roller 52 such that a desired thickness of adhesive 50 is carried beyond the doctor blade. Offset roller 54 has raised indicia of the adhesive pattern to be printed on its circumferential surface. Roller 54 rotates clockwise in contact with gravure roller 52, which action transfers the pattern of adhesive from gravure roller 52 to the raised indicia on offset roller 54. A sheet 56 to be printed with adhesive is indexed to the pattern on offset roller 54 (by means not shown) and is passed through the nip 58 between offset roller 54 and backing roller 60, whereby the pattern of adhesive domains in accordance with the invention is transferred from the raised indicia on offset roller 54 to a surface of sheet 56.

A schematic elevation view of a nip-roll laminator 62 disclosed in commonly-assigned U.S. Pat. No. 5,473,406 issued Dec. 5, 1995 is shown in FIG. 7 in use at the beginning of a lamination. An adhesive-free first sheet 70 is moved down first infeed chute 72 until leading edge 74 contacts the rollers at nip 64. If first sheet 70 is a lenticular array sheet, its thickness may require that the nip 64 between opposed rollers 66 and 68 be opened (by means not shown) to admit sheet 70 without damaging edge 74. Inn this case, leading edge 74 is extended just beyond, approximately 6 mm, the nominal line of contact at nip 64. The nip is then closed to the position shown in FIG. 7 and the rollers are loaded to a pressure selected in accordance with the invention as described hereinabove. A second sheet 76 supported on second infeed chute 77 and bearing a pattern of adhesive domains on its upper surface 78 is tucked into the nip below first sheet 70, after which the rollers are rotated to proceed with the lamination. If both sheets are relatively thin, i.e., on the order of 0.10 mm, or if the rollers are large in diameter, i.e., on the order of 300 mm, both sheets may be inserted into the nip without prior opening of the nip and without damage to the leading edges of the sheets. Because sheet 70 is supported on chute 72 as the sheet is drawn into the nip, the portion of sheet 70 immediately following edge 74 is flexed away from second sheet 76 at the nip and wraps through a small angle into contact with roller 68. This deformation maximizes the opening of the nip as permitted by the diameters of rollers 66 and 68, and improves the venting of air from between the sheets. Sheets 70 and 76 may also be inserted into the nip with their leading edges aligned; however, this may result in somewhat poor lamination near the leading edges which may require that the laminate be trimmed in such a way that the size of the completed product is reduced.

EXAMPLE

A 0.10 mm thick polyester sheet bearing a lineiform image is coated on its image surface by the apparatus shown in FIG. 6 to the pattern shown in FIG. 2 with a radiation-curable adhesive having a viscosity of 300 centipoises. Strips are 4 µm thick and 1.6 mm wide, separated by 1.0 mm adhesive-free spaces. The coated polyester sheet is laminated to a lenticular array sheet made of acrylic plastic having a thickness of about 1.27 mm, using a paired-roller laminator having rollers 150 mm in diameter operating at a linear speed of 3 meters per minute with a nip force of 75,000 Newtons per meter of nip length. The lenticular array sheet then is rotated and translated with respect to the lineiform sheet to align the lenticules of the array sheet with image bundles of the lineiform sheet. The laminate is then exposed to ultraviolet radiation through the lenticular sheet sufficient to cure the adhesive and fix the alignment between the image sheet and the lenticular sheet, yielding a depth image print of very high quality, being uniformly adhered with no voids between the sheets and no flow-out of adhesive at the edges.

The many features and advantages of the invention are apparent from the detailed specification and thus it is intended by the appended claims to cover all such features and advantages which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

PARTS LIST 10 sheet bearing stripes
12 adhesive domains on 10
14 adhesive-free spaces on 10
16 direction of lamination
18 leading edge of 10
20 connecting domain on 10
22 boundaries or knitlines
24 left edge of 10
26 right edge of 10
28 notch or indent at distal end of 12
30 trailing edge of 10
32 sheet bearing angled grid of domains
34 quadrangular domains on 32
35 connecting domain on 32
36 diagonals of 34
38 adhesive-free lanes on 32
40 leading edge of 32

42 trailing edge of 32
44 left edge of 32
46 right edge of 32
47 offset gravure coater
48 reservoir pan on 47
50 low-viscosity adhesive
52 gravure roller
53 doctor blade
54 offset roller
56 sheet to be printed by 47
58 nip between 54 and 60
60 backing roller
62 nip-roll laminator
64 nip of 62
66 first pressure roller of 62
68 second pressure roller of 62
70 adhesive-free sheet
72 infeed chute
74 leading edge of 70
76 second sheet bearing pattern of adhesive domains
77 second infeed chute
78 upper surface of 76

What is claimed is:

1. A pattern of optically clear, bubble free adhesive for laminating a first sheet to a second sheet, said sheets having leading edges and trailing edges, said pattern of adhesive comprising a plurality of domains of radiation curable adhesive, wherein said adhesive is a liquid having a viscosity of between about 10 and about 3000 centipoises, a substantially uniform thickness of between about 2 μm and 50 μm, on said first sheet, said pattern of domains being selected to allow air to vent from between said domains and to allow said domains of adhesive to coalesce during said laminating into a single domain of adhesive which fills a volume between said first and second sheets without flowing beyond said edges of said sheets, said adhesive domains comprising a plurality of stripes of adhesive which are between 0.75 mm and 20 mm in width with adhesive-free spaced of between 0.75 mm and 20 mm in width therebetween, the longitudinal direction of said stripes being at an angle of less than 90° to the direction of laminating which is progressive along said sheets in a direction of lamination from said leading edge to said trailing edges.

2. The pattern in accordance with claim 1 wherein one of said first and second sheets is a lenticular overlay.

3. The pattern in accordance with claim 1 wherein one of said first and second sheets is a lineiform image print.

4. The pattern in accordance with claim 1 wherein said adhesive domains comprise a rectilinear array of quadrangles with adhesive-free spaces therebetween, diagonals of said quadrangles being substantially parallel to the direction of said progressive laminating.

5. The pattern in accordance with claim 1 wherein said angle is about 0°.

6. The pattern in accordance with claim 1 wherein said stripes are joined at one end of said stripes.

7. The pattern in accordance with claim 1 wherein said stripes are indented at one end of said stripes.

* * * * *